US012358831B2

(12) United States Patent
Dinkel et al.

(10) Patent No.: US 12,358,831 B2
(45) Date of Patent: *Jul. 15, 2025

(54) ASSEMBLY AND METHOD FOR CLEAVING A GLASS BODY WITH A LASER

(71) Applicant: OpTek Systems, Inc., Greenville, SC (US)

(72) Inventors: Duane Dinkel, Simpsonville, SC (US); Sean Kelly, Maudlin, SC (US); Mike O'Key, Oxford (GB); Camden Druga, Greenville, SC (US)

(73) Assignee: OpTek Systems, Inc., Greenville, SC (US)

( * ) Notice: Subject to any disclaimer, the term of this patent is extended or adjusted under 35 U.S.C. 154(b) by 539 days.

This patent is subject to a terminal disclaimer.

(21) Appl. No.: 17/905,696

(22) PCT Filed: Jul. 22, 2021

(86) PCT No.: PCT/US2021/042771
§ 371 (c)(1),
(2) Date: Sep. 6, 2022

(87) PCT Pub. No.: WO2022/020587
PCT Pub. Date: Jan. 27, 2022

(65) Prior Publication Data
US 2023/0115162 A1    Apr. 13, 2023

Related U.S. Application Data

(60) Provisional application No. 63/073,705, filed on Sep. 2, 2020, provisional application No. 63/055,307, filed on Jul. 22, 2020.

(51) Int. Cl.
*C03B 37/16* (2006.01)
*B23K 26/08* (2014.01)
(Continued)

(52) U.S. Cl.
CPC .......... *C03B 37/16* (2013.01); *B23K 26/0823* (2013.01); *B23K 26/38* (2013.01);
(Continued)

(58) Field of Classification Search
CPC ........ C03B 37/16; G02B 6/25; B23K 26/0823
See application file for complete search history.

(56) References Cited

U.S. PATENT DOCUMENTS 4,820,321 A    4/1989  Presby
4,932,989 A    6/1990  Presby
(Continued)

FOREIGN PATENT DOCUMENTS

CN    1308031 A    8/2001
EP    0391598 B1   5/1994
(Continued)

OTHER PUBLICATIONS

English language abstract for KR 101763637 B1 extracted from espacenet.com database on Sep. 1, 2022, 1 page.
(Continued)

*Primary Examiner* — Erin Snelting
(74) *Attorney, Agent, or Firm* — Howard & Howard Attorneys PLLC

(57) ABSTRACT

A cleaving assembly and a method for cleaving a glass body having a face at a desired angle greater than 0 degrees are disclosed. The assembly comprises a laser device for emitting a laser beam, a rotating device, and a positioning fixture. The rotating device has a head that rotates about a central axis that is orthogonal to the laser beam. The positioning fixture is operatively mounted to the head and centered axially along the central axis and is also rotatably driven by the rotating device. The positioning fixture has a tapered surface that is transverse to the central axis and that supports the glass body at a predetermined angle relative to the
(Continued)

central axis. Rotation of the positioning fixture about the central axis when the glass body is exposed to the laser beam, cleaves the face of the glass body at the desired angle due to the glass body being supported transverse to the central axis.

19 Claims, 10 Drawing Sheets

(51) Int. Cl.
| | |
|---|---|
| *B23K 26/38* | (2014.01) |
| *B23K 26/402* | (2014.01) |
| *B23K 37/04* | (2006.01) |
| *C03B 33/06* | (2006.01) |
| *C03B 33/095* | (2006.01) |
| *G02B 6/25* | (2006.01) |
| *B23K 101/06* | (2006.01) |
| *B23K 103/00* | (2006.01) |

(52) U.S. Cl.
CPC ........ *B23K 26/402* (2013.01); *B23K 37/0426* (2013.01); *C03B 33/06* (2013.01); *C03B 33/0955* (2013.01); *G02B 6/25* (2013.01); *B23K 2101/06* (2018.08); *B23K 2103/54* (2018.08); *C03B 2203/02* (2013.01)

(56) References Cited

U.S. PATENT DOCUMENTS

| | | | |
|---|---|---|---|
| 5,256,851 A | 10/1993 | Presby | |
| 5,501,385 A | 3/1996 | Halpin | |
| 5,779,753 A * | 7/1998 | Vetter | C03C 23/0025 65/105 |
| 6,774,341 B2 | 8/2004 | Ohta | |
| 7,142,741 B2 | 11/2006 | Osborne | |
| 7,216,512 B2 | 5/2007 | Danley et al. | |
| 8,340,485 B2 | 12/2012 | Danley et al. | |
| 8,961,036 B2 | 2/2015 | Webb et al. | |
| 9,089,931 B1 | 7/2015 | Carberry et al. | |
| 9,205,609 B1 | 12/2015 | Danley et al. | |
| 9,416,046 B2 | 8/2016 | Carberry et al. | |
| 9,690,048 B2 | 6/2017 | Hagen et al. | |
| 10,451,815 B2 | 10/2019 | Flaig et al. | |
| 2002/0175151 A1* | 11/2002 | Ohta | G02B 6/2552 219/121.73 |
| 2003/0205562 A1 | 11/2003 | Vergeest et al. | |
| 2004/0020906 A1* | 2/2004 | Ohta | B23K 26/38 219/121.72 |
| 2004/0047587 A1* | 3/2004 | Osborne | G02B 6/25 385/147 |
| 2006/0137403 A1 | 6/2006 | Barr et al. | |
| 2010/0303416 A1* | 12/2010 | Danley | G02B 6/3846 219/121.72 |
| 2014/0116995 A1* | 5/2014 | Berg | B23K 26/40 219/121.6 |
| 2014/0332510 A1 | 11/2014 | Danley et al. | |
| 2015/0030291 A1 | 1/2015 | Webb et al. | |
| 2015/0218038 A1 | 8/2015 | Carberry et al. | |
| 2017/0010416 A1* | 1/2017 | Hagen | G02B 6/3616 |
| 2020/0292756 A1 | 9/2020 | Langseth et al. | |

FOREIGN PATENT DOCUMENTS

| | | |
|---|---|---|
| EP | 0558230 B1 | 4/1997 |
| EP | 1330331 B1 | 4/2009 |
| KR | 101763637 B1 | 8/2017 |
| WO | 2022020587 A1 | 1/2022 |

OTHER PUBLICATIONS

International Search Report for Application No. PCT/US2021/042771 dated Nov. 17, 2021, 1 page.
Optek Systems, "Laser Processed Fiber Assemblies Brochure", 2020-2021, 10 pages.
U.S. Appl. No. 17/823,858, filed Sep. 6, 2022.
European Search Report for Application EP 23 19 3560 dated Jan. 15, 2024, 2 pages.
Zheng, Wenxin et al., "Ball-Shaped End-Caps for Fiber Laser Systems", Proc. of SPIE, vol. 10525, 9 pages.
Chinese Search Report for Application CN 2021800127477 dated Feb. 6, 2025, 2 pages.
English language abstract for CN 1308031 A extracted from espacenet.com database on Feb. 28, 2025, 1 page.

* cited by examiner

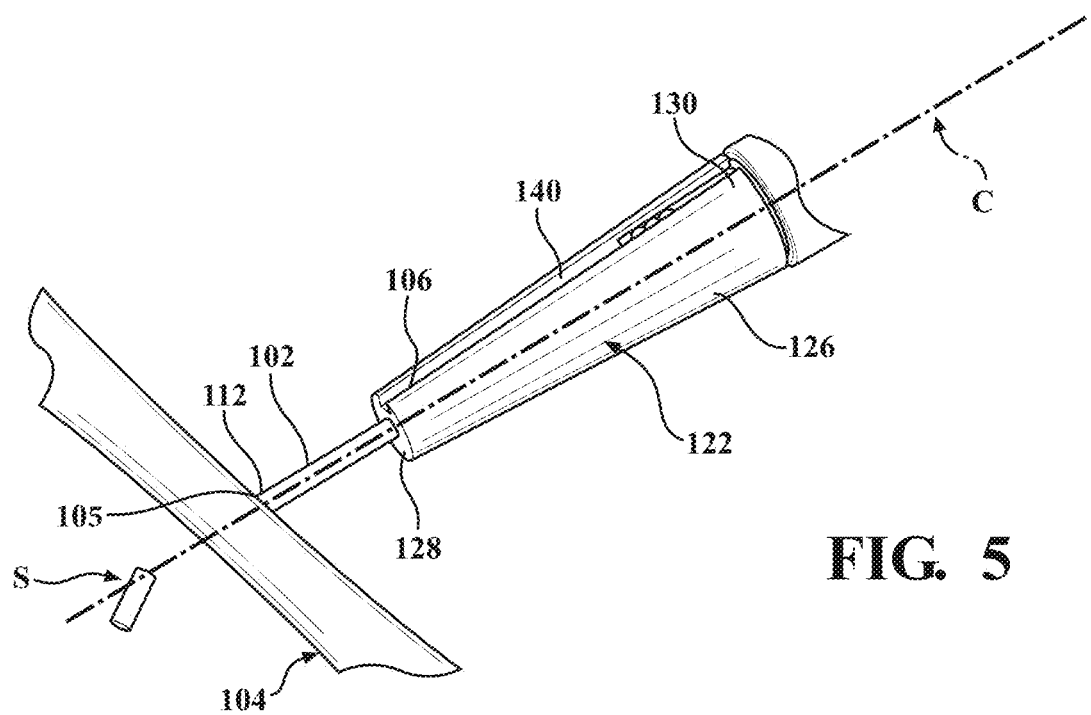
FIG. 5
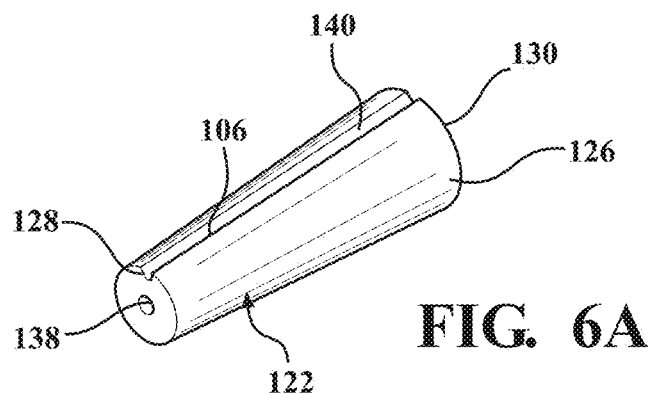
FIG. 6A
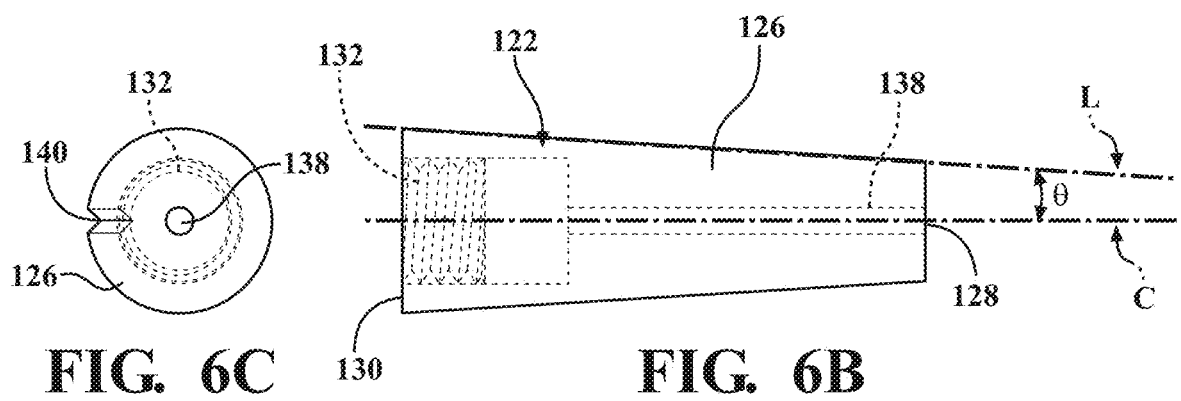
FIG. 6C  FIG. 6B

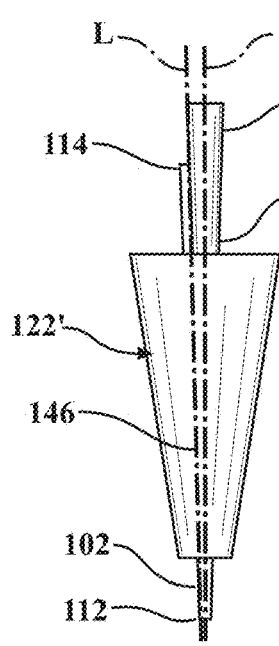 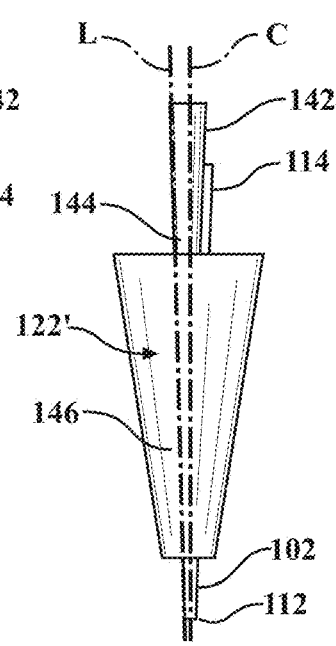 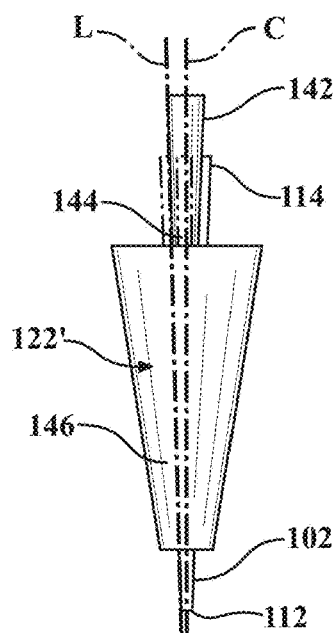
FIG. 9A  FIG. 9B  FIG. 9C
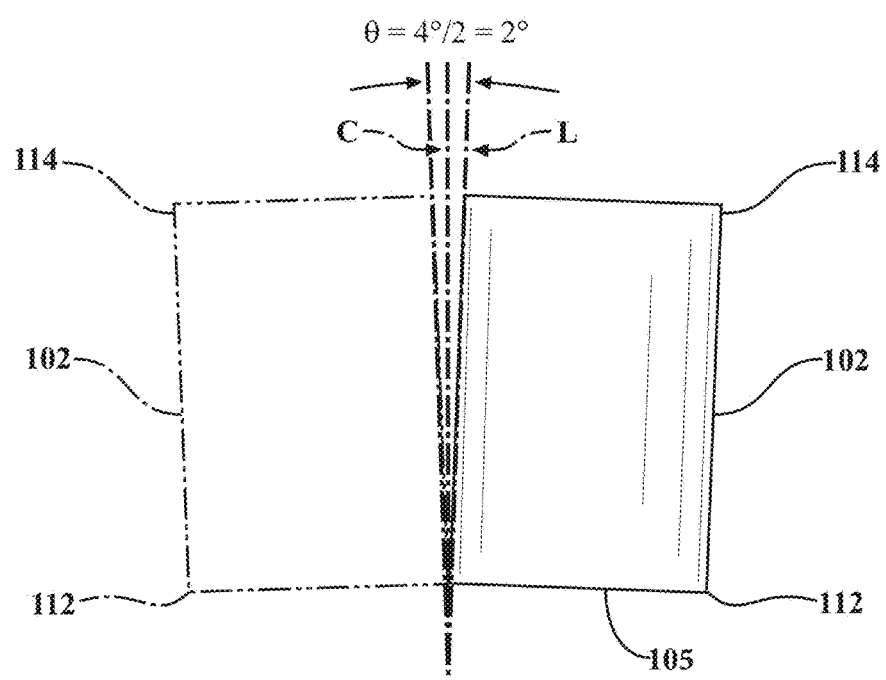
FIG. 10

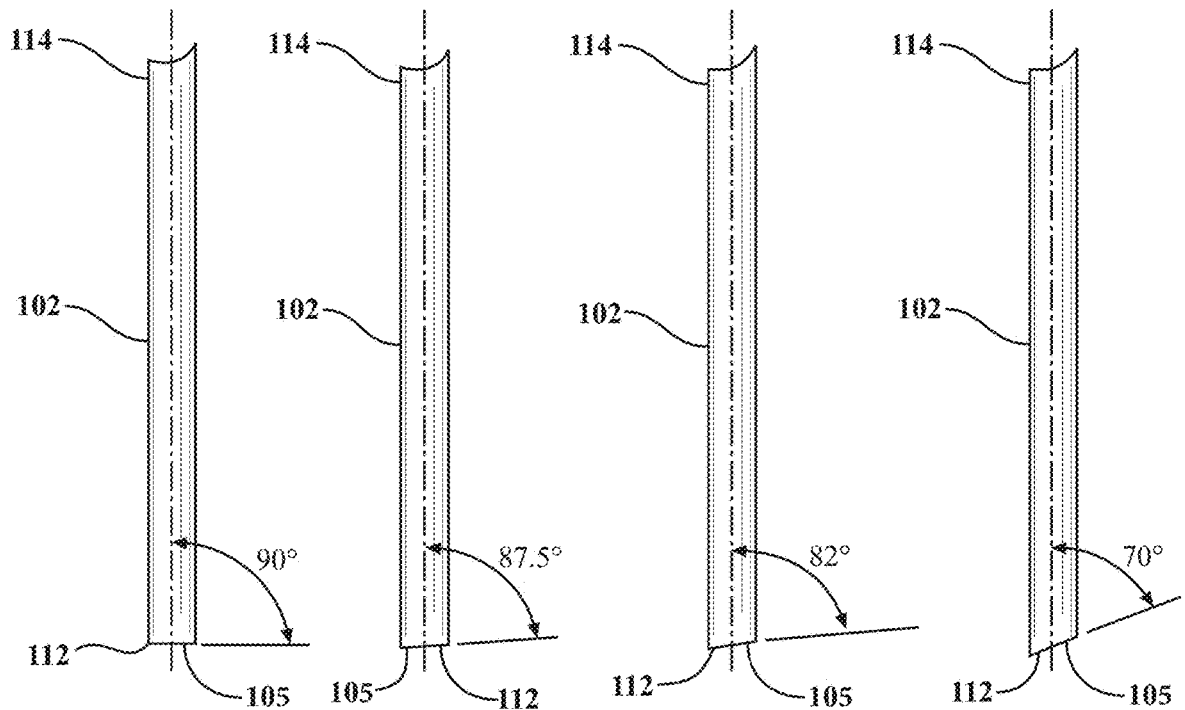
FIG. 11A  FIG. 11B  FIG. 11C  FIG. 11D
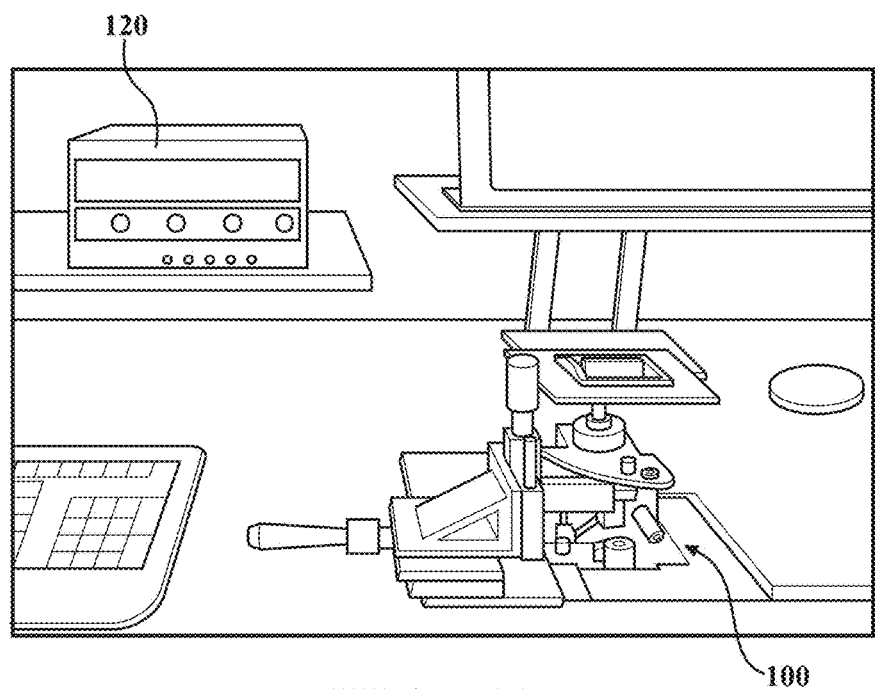
FIG. 12

ASSEMBLY AND METHOD FOR CLEAVING A GLASS BODY WITH A LASER

CROSS REFERENCE TO RELATED APPLICATIONS

This application is the national phase of International Application No. PCT/US2021/042771 filed on Jul. 22, 2021, which claims priority to U.S. Provisional Patent Application No. 63/055,307 filed on Jul. 22, 2020 and U.S. Provisional Patent Application No. 63/073,705 filed on Sep. 2, 2020, the contents of which are hereby incorporated by reference.

BACKGROUND

1. Field of the Invention

This invention relates to an assembly and method for cleaving or cutting a glass body, such as rod, capillary, or optical fiber and more particularly, but not exclusively, an angle cleaving or cutting assembly for cleaving or cutting a cylindrical glass body with a laser.

2. Description of the Prior Art

Various techniques are known for cleaving or cutting optical fibers and achieving an optical-grade surface. Some techniques require mechanical scoring, followed by a torsional break, followed by a mechanical polish or lapping to rid the surface of hackle, chatter, and cracks brought on by the mechanical scoring. Other techniques, such as laser processing under controlled optical conditions (such as disclosed in U.S. Pat. No. 7,142,741 B2), are capable of achieving similar optical properties as the mechanical polishing techniques. There are advantages and disadvantages associated with these two techniques and, depending on the specific application, one method may be preferred over the other.

Since the early 2000's, laser processing of optical fiber has become an industry-accepted standard, though mechanical polishing remains the dominant method of processing optical fiber because of its low entry cost and versatility. Historically, one disadvantage of mechanical polishing optical fiber is that the surface deformations brought on by mechanical scribing need to be completely removed, often requiring lengthy and costly polishing steps. Additional disadvantages are the inability to polish the optical fibers to precise axial dimensions, the inability to align the stress members with polarization maintaining fibers relative to prescribed angles, and the increased tooling costs associated with achieving non-standard surface angles (i.e., 0° or 8°).

Most recently, however, with the influx of high-power transmission needed for 5G, autonomous vehicle sensors, and military weapons, the silica deposits embedded in micro-abrasions found on the surface of optical fiber from conventional polishing techniques are found to be highly absorptive and disruptive to the optical transmissions, creating undesirable back reflections and beam scatter. When these detriments are present, ultimately device failure occurs (optical fiber or active devices). For this reason, laser processing of conventional optical fibers used in these applications is gaining significant momentum, however, there are still disadvantages of such laser processing of large diameter glass bodies.

Today's laser processing methods are well-suited for conventional optical fibers, specifically, optical fibers that are comprised of cores and claddings with total combined diameters of 125 um or less. However, laser processing optical fibers or other glass bodies with combined core/clad diameters greater than 125 um becomes problematic due to energy differentials of the entrance beam relative to the exit beam. Such entry/exit effects create undulating surfaces that impair optical transmission, creating uncontrollable back reflections and introducing beam skew and non-Gaussian energy distributions of the transmitted beam. The surface undulations are further exacerbated during angled cleaving of optical fibers, which heighten the entry/exit effects because of the increased cutting lengths along the hypotenuse.

SUMMARY

The subject invention provides a cleaving assembly for cleaving a glass body having a face at a desired angle greater than 0 degrees and with reduced light-scattering or absorbing detriments. The assembly comprises a laser device for emitting a laser beam, a rotating device, and a positioning fixture. The rotating device has a head that rotates about a central axis that is orthogonal to the laser beam. The positioning fixture is operatively mounted to the head and centered axially along the central axis and is also rotatably driven by the rotating device. The positioning fixture has a tapered surface that is transverse to the central axis and that supports the glass body at a predetermined angle relative to the central axis. Rotation of the positioning fixture about the central axis when the glass body is exposed to the laser beam, cleaves the face of the glass body at the desired angle due to the glass body being supported transverse to the central axis.

The subject invention further provides a method of cleaving a glass body with a cleaving assembly. The cleaving assembly includes a laser device for emitting a laser beam, a rotating device, and a positioning fixture. The method includes the steps of positioning the rotating device and the positioning fixture centrally aligned along a central axis that is orthogonal to the laser beam and mounting the positioning fixture to a head of the rotating device, while supporting the glass body along a tapered surface of the positioning fixture. The tapered surface extends transverse to the central axis at a predetermined angle. Next, the positioning fixture and the head of the rotating device is rotated about the central axis while the glass body is supported at the predetermined angle such that the laser beam cleaves the face of the glass body at a desired angle corresponding to the predetermined angle.

The subject invention has numerous advantages over the prior art assemblies and methods. First, the subject invention provides a face that is substantially free of surface undulations and detriments allowing the glass bodies to be processed free of the light-scattering or absorbing detriments of mechanical polishing. As a result, when cleaving according to the subject invention, the face of the glass body does not demonstrate undesirable entry/exit effects. Another advantage of the subject invention is that multiple different positioning fixtures of different predetermine angles can be quickly interchanged on the rotating device while maintaining precision of the laser cleaving and at the precise desired angle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5 is a close-up view of the positioning fixtured for cleaving a flat face on the glass body;

FIG. 6A is a perspective view of a positioning fixture according to one embodiment of the subject invention;

FIG. 6B is a cross-sectional view of the positioning fixture shown in FIG. 6A;

FIG. 6C is an end view of the positioning fixture shown in FIG. 6A;

FIGS. 9A-9B are schematic views of the positioning fixture shown in FIG. 8A;

FIG. 9C is a schematic view of the positioning fixture shown in FIG. 8A at discrete points of rotation about the central axis;

FIG. 10 is a close-up of the glass body at specific rotational angles;

FIG. 11 shows various cleave angles on different glass bodies formed according to the subject invention;

FIGS. 12-14 are schematics of one embodiment of a cleaving assembly according to the subject invention;

DETAILED DESCRIPTION OF THE INVENTION

Figure 1:
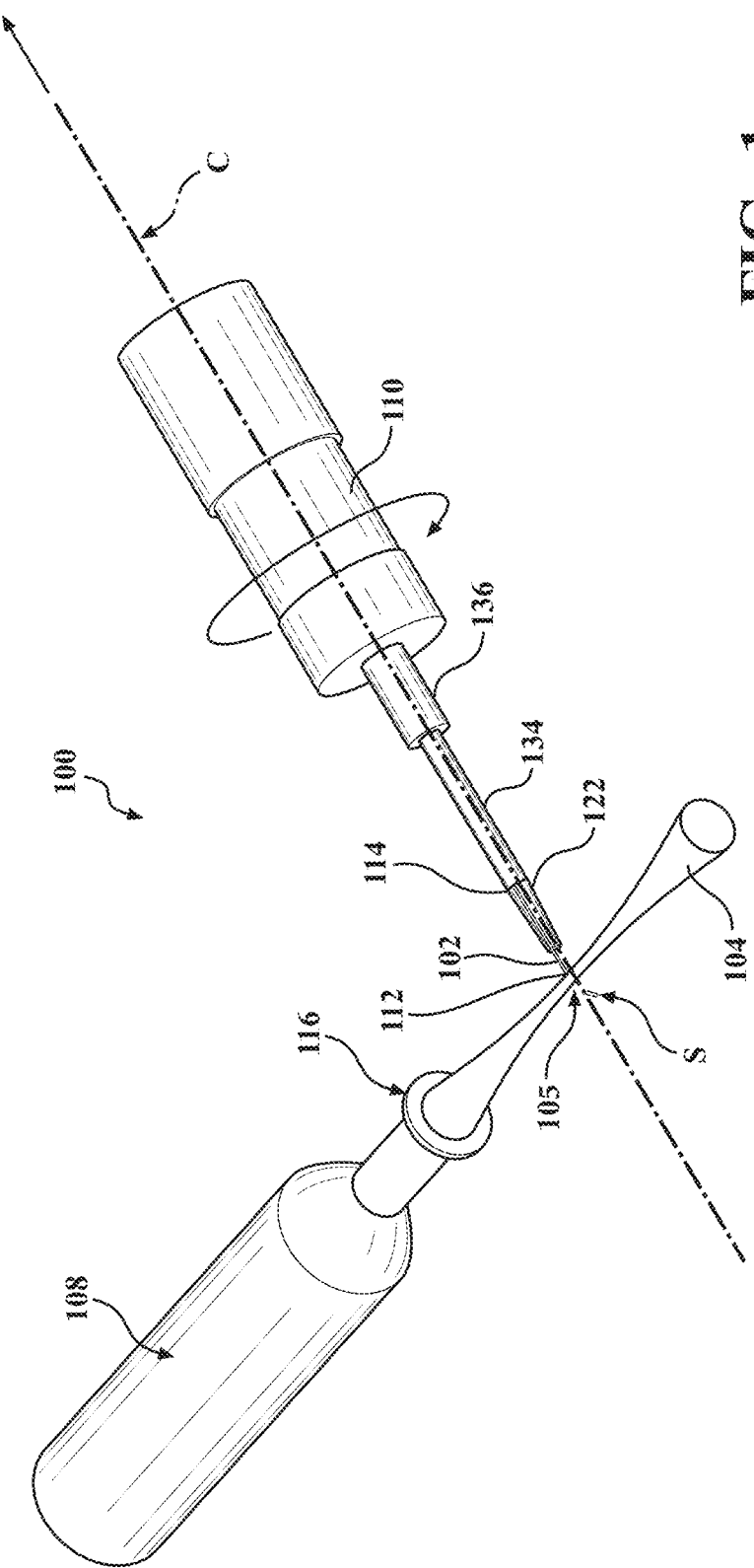
FIG. 1 is a perspective view of a cleaving assembly according to the subject invention having a laser device and a rotating assembly for cleaving a glass body, such as rod, capillary, or optical fiber.

The present invention relates generally to an assembly 100 and method of cleaving a glass body 102 with a laser beam 104 to a desired angle. The glass bodies 102, include, but are not limited to, glass rods, capillaries, ferrules, tubes, and optical fibers. Generally, the glass body 102 is cylindrical and are particularly useful in beveled surface applications and optical applications (high-power and other applications sensitive to back reflections, light scatter, beam skew and optical transmission). The assembly 100 can be used for angles greater than 0 degrees and will create the angle on a face 105 of the glass body 102 free of a lens or taper.

Referring to FIG. 1, a perspective view of one embodiment of the cleaving assembly 100 for cleaving the glass body 102 is shown generally having a laser device 108 and a rotating device 110. The glass body 102 may include a glass rod, a glass capillary, or an optical fiber. The glass body 102 has a diameter of at least 125 µm and would be considered by those of skill in the art as a large diameter when compared against a conventional, telecom-grade optical fiber. The glass body 102 extends along a longitudinal central axis C between a first end 112 and a second end 114. The first end 112 of the glass body 102 presents the face 105 to be cleaved or finished. The glass body 102 may be any desired length depending upon the particular application. The glass body 102 may be hollow or solid. Referring to one embodiment of the glass body 102 as a glass rod, preferably the glass rod would be solid. In another embodiment, when the glass body 102 is a glass capillary, the glass capillary may be hollow. In yet another embodiment when the glass body 102 is an optical fiber, the optical fiber comprises at least one core, which is formed of a glass material. Optionally, the optical fiber may include a cladding (not shown) surrounding the core and an outer coating (not shown) surrounding the core. Further, the optical fiber may include a plurality of cores. The subject invention may be practiced with any of the various different types of glass bodies described herein, but is particularly useful with solid glass rods of large diameters above 125 µm.

The laser device 108 emits the laser beam 104, preferably a carbon dioxide laser beam 104 with the wavelength of 10.6 µm. It is to be appreciated that other types of laser devices 108 having different types of beam shapes and different wavelengths may be used with the subject invention. For example, the laser device 108 may be quantum cascade laser, UV-excimer laser, semiconductor laser, or the like, and which may emit the laser beam 104 with a wavelength between 0.2 and 11 µm. The laser device 108 may include focusing systems 116 to direct and manipulate the laser beam 104 to the first end 112 of the glass body 102.

Figure 2:
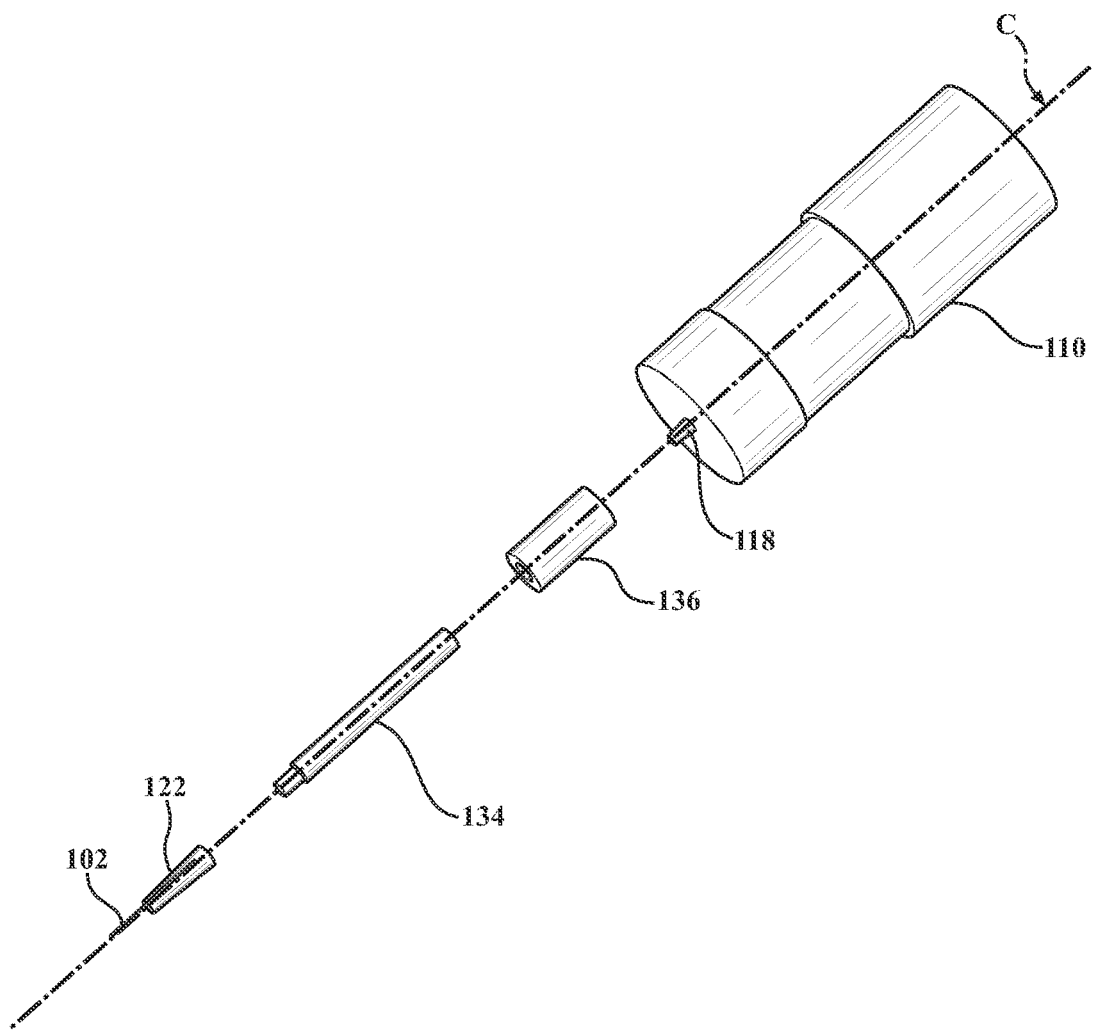
FIG. 2 is an exploded, perspective view of the rotating device and a positioning fixture used for cleaving the glass body.

Referring to FIG. 2, the rotating device 110 includes a head 118 that rotates about the central axis C that is orthogonal to the laser beam 104 emitted by the laser device 108. A positioning fixture 122 is operatively mounted to the head 118 and centered axially along the central axis C. The positioning fixture 122 is rotatably driven by the rotating device 110 about the central axis C. The positioning fixture 122 has a tapered surface 106 (best shown in FIG. 5) that is transverse to the central axis C and that supports the glass body 102 at a predetermined angle θ relative to the central axis C. Rotation of the positioning fixture 122 about the central axis C while laser beam 104 is directed toward the glass body 102 cleaves the face 105 of the glass body 102 at the desired angle due to the glass body 102 being supported transverse to the central axis C.

Figure 3:
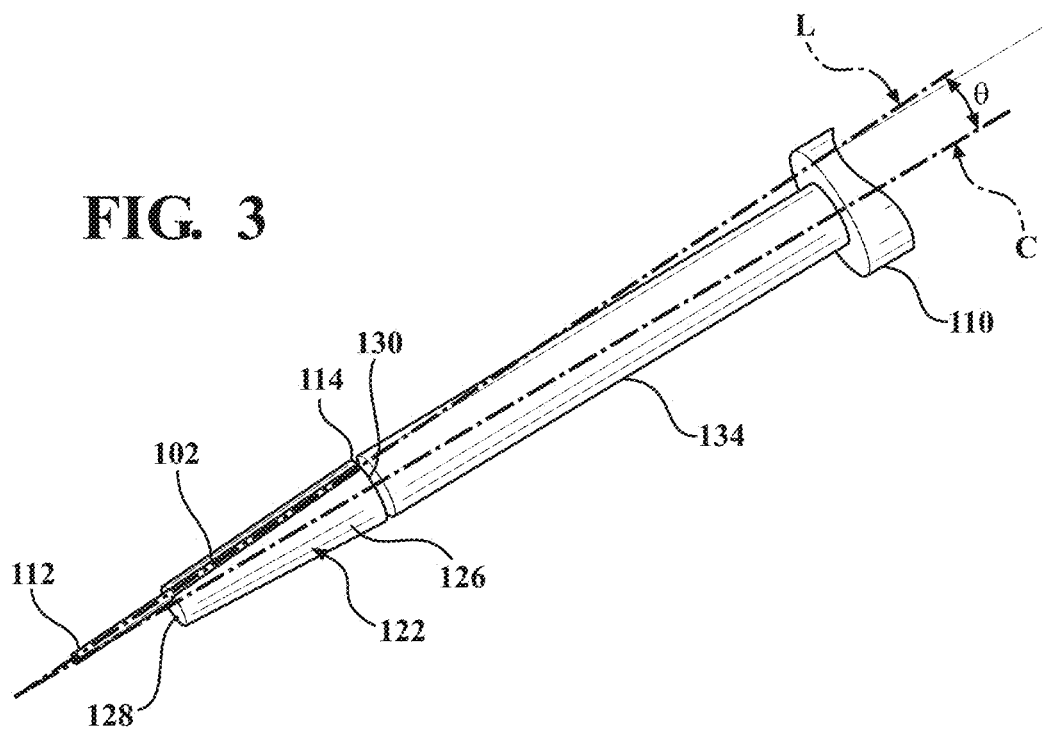
FIG. 3 is a close-up perspective view of the positioning fixture attached to the rotating device.

With reference to FIG. 3, the positioning fixture 122 has an outer surface 126, a front face 128, and a rear face 130. The rear face 130 defines a mount 132 for operatively mounting to the head 118. Referring to FIGS. 6B and 8B, the mount 132 is further shown as being threaded. As one example, the mount 132 may a M6 or 0.25-32 thread.

Referring back to FIGS. 1 and 2, an extender 134 is operatively mounted between the positioning fixture 122 and the head 118. The extender 134 secures the positioning fixture 122 operatively to the rotating device 110. Additionally, the extender 134 may also serve as a secondary support for the glass body 102 for applications requiring the rotation of a large body around the center axis C, as discussed further discussed below. The extender 134 may also be threaded at one or both of the ends as either male or female connections. It is to be appreciated that the extender 134 may be used with certain types of glass bodies 102 and not used with other types of glass bodies 102.

The subject invention may also include an adapter 136 operatively mounted between the extender 134 and the head 118. The adapter 136 may also be threaded at one or both of the ends for mounting between the extender 134 and the head 118. It is to be appreciated that the adapter 136 may be used with certain types of glass bodies 102 and not used with other types of glass bodies 102. Further, in some embodiments, either the extender 134 or the adapter 136 may be omitted without deviating from the subject invention.

Referring to the glass body 102 shown in the Figures, the glass body 102 extends between the first end 112 and the second end 114. The tapered surface 106 of the positioning fixture 122 supports the glass body 102 such that the first end 112 and the second end 114 may lie transverse to the central axis C of the rotating device 110, and if present, the extender 134 and the adapter 136. In the embodiment shown in FIGS. 1 and 2, the positioning apparatus, the extender 134, and the adapter 136 are connected together and are centered axially along the central axis C.

FIG. 3 shows the central axis C along the extender 134, the adapter 136, and the positioning fixture 122. The glass body 102 is presented at a predetermined angle drawn along axis L. The predetermined angle between C and L, defined as θ, is controllable per the tapered surface 106.

Figure 4:
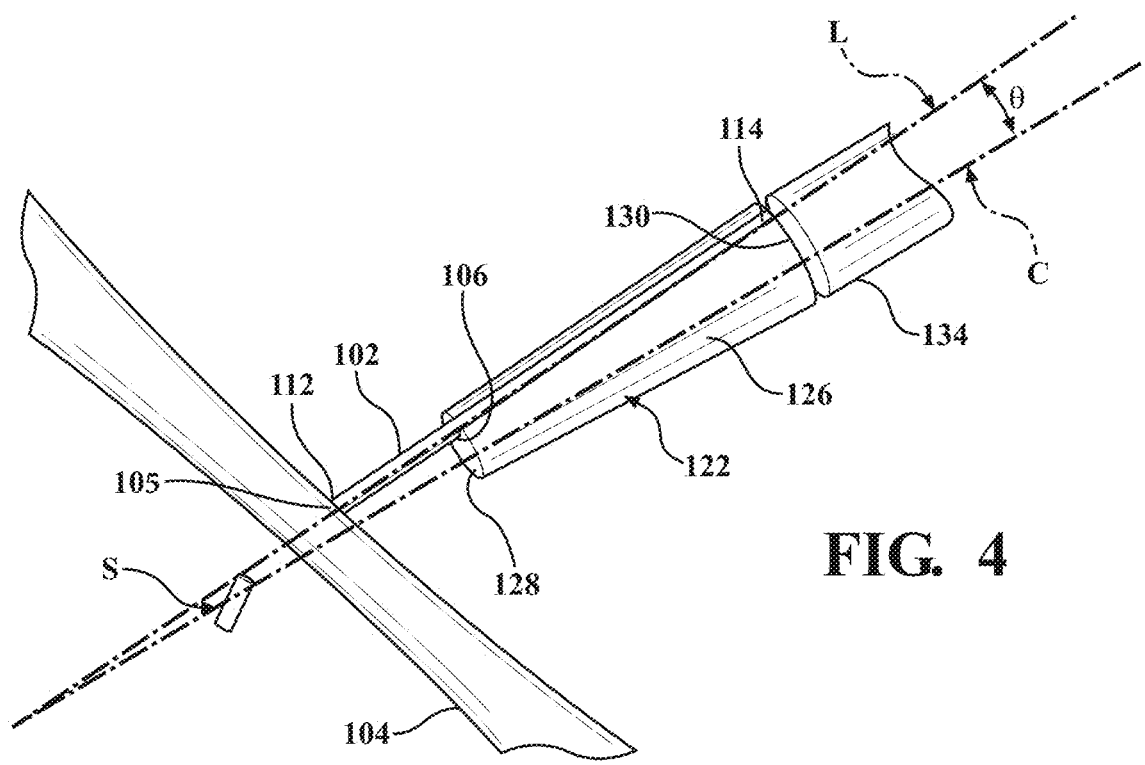
FIG. 4 is a close-up view of the positioning fixture supported the glass body during rotation and cleaving with a laser beam.

Specifically, referring to FIG. 4, a close-up perspective view of the cleaving apparatus is shown. In this embodiment, the positioning fixture 122 has the extender 134 integrated therein and the positioning fixture 122 rotates about the central axis C. The laser beam 104 cleaves the glass body 102 at its first end 112 point, resulting in a lost shard S that is then disposed. The face 105 of the glass body 102 is then transformed into an angled geometry that matches the desired angle.

FIG. 5 shows the positioning fixture 122 having an inner bore 138 extending between the front face 128 and the rear face 130 with the inner bore 138 centered axially along the central axis C. In various embodiments, the positioning fixture 122 may have a conical shape. The tapered surface 106 is defined as a channel 140 in the outer surface 126 that extends between the front face 128 and the rear face 130. The tapered surface 106 has the predetermined angle of from greater than 0 degrees to 45 degrees. In this embodiment, the central axis C is the same as the axial center L of the glass body 102. As such, the glass body 102 is rotating around both C and L, resulting in a flat, 0° surface 106 geometry. Such a configuration allows the positioning fixture 122 to produce two different types of surface geometry on the face 105, i.e. the face 105 having the desired angle and a flat geometry. One advantage of the subject invention is that various positioning fixtures 122 can be made having different predetermined angles. Thus, when a different angle is needed on a different glass body 102, the positioning fixture 122 is selected with the appropriate tapered surface 106. This allows for quick changes of the positioning fixture 122 while maintaining precise cleaving of the glass body 102.

FIG. 6A is a perspective view of the positioning fixture 122 shown in FIG. 5. FIG. 6B is a cross-sectional view and FIG. 6C is an end view of the positioning fixture 122 shown in FIG. 5. The positioning fixture 122 has the channel 140 that runs down the outer surface 126 to define the tapered surface 106 at the predetermined angle θ. The channel 140 ensures that compound angles are eliminated during the cleaving operation. The predetermine angle controls the cleave during the rotation and cleaving operation.

Figure 7:
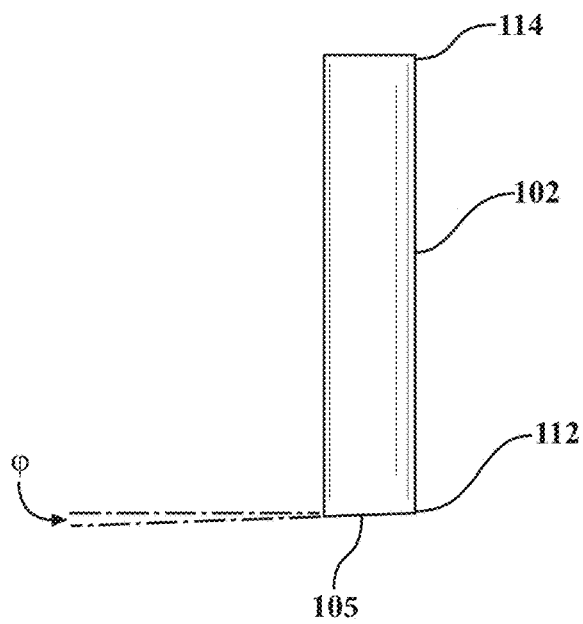
FIG. 7 is a close-up view of the glass body having an angled tip.

FIG. 7 is a close-up schematic of the glass body 102 formed according to the invention using the positioning fixture 122 and having been exposed to the laser beam 104 while being rotated. The face 105 of the glass body 102 has the desired angle of 2 degrees.

Figure 8A:
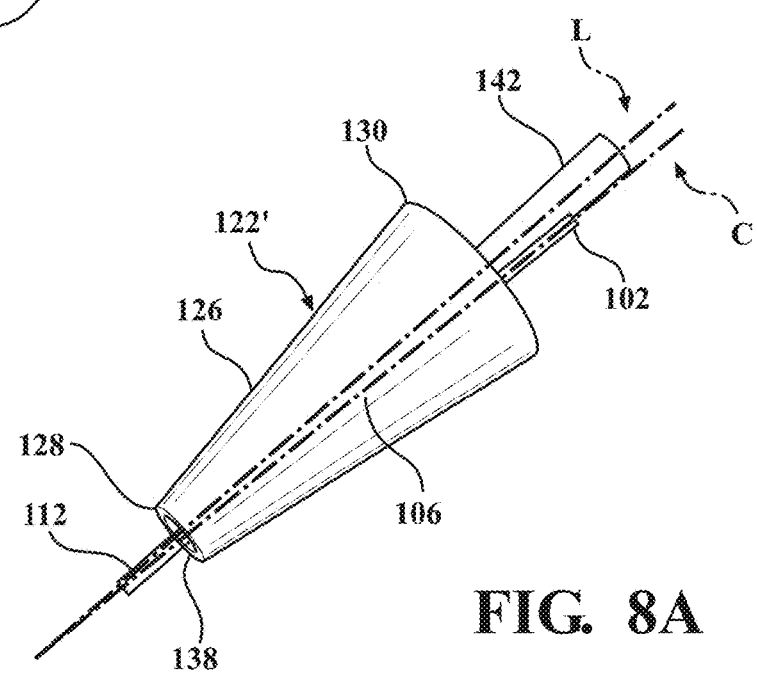
FIG. 8A is a perspective view of a positioning fixture according to another embodiment of the subject invention.

Referring now to FIG. 8A, another embodiment of a positioning fixture 122' is shown. The positioning fixture 122' includes the front face 128, the rear face 130, the outer surface 126, and the inner bore 138, but with regard to this embodiment, the positioning fixture 122' defines the tapered surface 106 within the inner bore 138. An insert 142, sized to be disposed within the inner bore 138, is inserted into the inner bore 138. The tapered surface 106 is defined between the insert 142 and the inner bore 138 and the glass body 102 is secured at the predetermined angle therebetween. Specifically, the insert 142 has an outer surface 144 that is inclined at the predetermined angle to define the tapered surface 106. The outer surface 144 may also include a channel 140'. In such an embodiment, multiple different inserts 142 can be used that have different predetermined angles, such as 2 degrees, 5 degrees, and so forth. Alternatively, the inner bore 138 has an inclined surface 146 at the predetermined angle to define the tapered surface 106. The inclined surface 146 may also include the channel 140'. In a similar fashion, different positioning fixtures 122 can be prepared having the inner bore 138 with different predetermined angles that can be easily changed while maintaining the precision of the cleave. The tapered surface 106 can define the predetermined angle of from greater than 0 degrees, or at least 0.5 degrees, to 45 degrees.

Figure 8C:
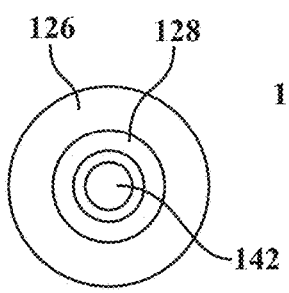
FIG. 8C is an end view of the positioning fixture shown in FIG. 8A.
Figure 8B:
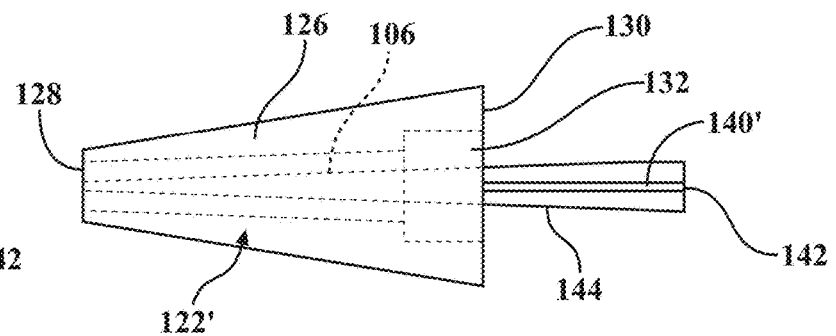
FIG. 8B is a cross-sectional view of the positioning fixture shown in FIG. 8A.

FIG. 8B is a cross-sectional view of the positioning fixture 122' shown in FIG. 8A and FIG. 8C is an end view of the positioning fixture 122' shown in FIG. 8A. In this embodiment, the glass body 102 is located within the inner bore 138 and is secured in place by the insert 142. The glass body 102 is easily inserted and removed and requires no channeling as the glass body 102 is secured by the wedging dynamic of the tapered insert 142. The insert 142 may be disposed within the fixture and mates with at least a portion of the inner bore 138 to secure the glass body 102. In one embodiment, the inner bore 138 may include the channel 140' to receive the glass body 102. The insert 142 holds the glass body 102 in the channel 140'. Alternatively, the channel 140 may be formed in the insert 142. In yet another embodiment, the glass body 102 could be held in position by bonding or the like so that it could be removed after being cleaved. FIG. 8C shows the diameter and thicknesses of the positioning fixture 122', the inner bore 138 and the insert 142.

FIGS. 9A and 9B illustrate the positioning fixture 122' at two positions as it rotates about the central axis C. In FIG. 9A, one position of the glass body 102 is shown at −180 degrees and, in FIG. 9B, another position of the glass body 102 is shown at +180 degrees. FIG. 9C shows the glass rod at 90 degree intervals as the positioning fixture 122' rotates with two of the positions shown in phantom. In this embodiment, the taper angle is 2 degrees.

FIG. 10 is a close-up of the glass body 102 in the −180 degree and +180 degree positions within the rotation of the positioning fixture 122'. The ends 112, 114, of the glass body 102 are exact mirrors of one another during the rotation, allowing the laser beam 104 to cleave to the desired angle, φ. The predetermined angle θ corresponds to the desired angle φ, as shown in FIG. 7.

FIG. 11 shows the versatility of glass rods that can be achieved with the cleaving assembly 100 of the subject invention that utilizes positioning fixtures 122, 122' with different predetermine angles such that an endless array of glass body 102 cleave angles can be obtained. FIG. 11 shows the glass body 102 having the first end 112 with the desired angles range from 0 degrees to any angle desirable. The angles illustrated in FIG. 11 are relative to the axial center L of the glass body 102. The axial center L has the predetermined angle defined by the tapered surface 124. The 90 degree angle would be denoted by those familiar with the art as a 0 degree cleave. The 87.5, 82, and 70 degree examples would represent a 2.5, 8, and 20 degree cleave by those familiar with the art.

Figure 13:
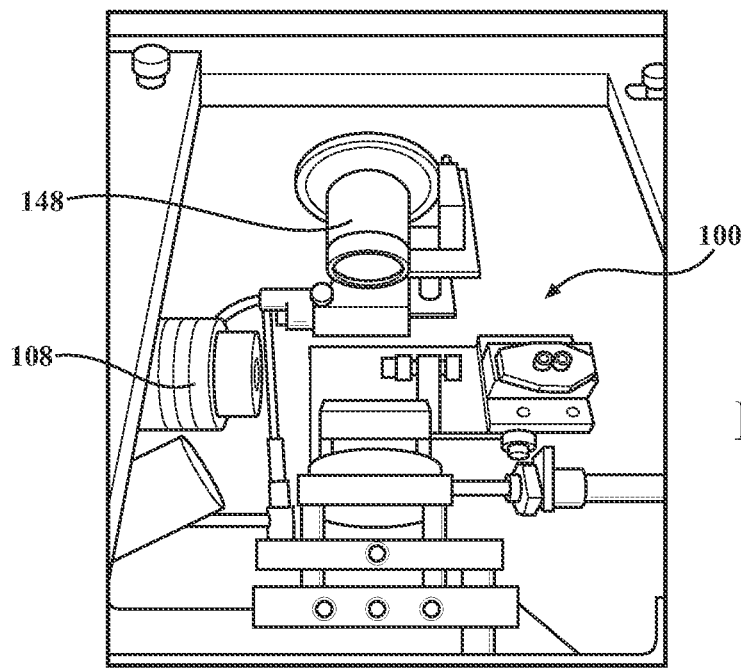
Figure 14:
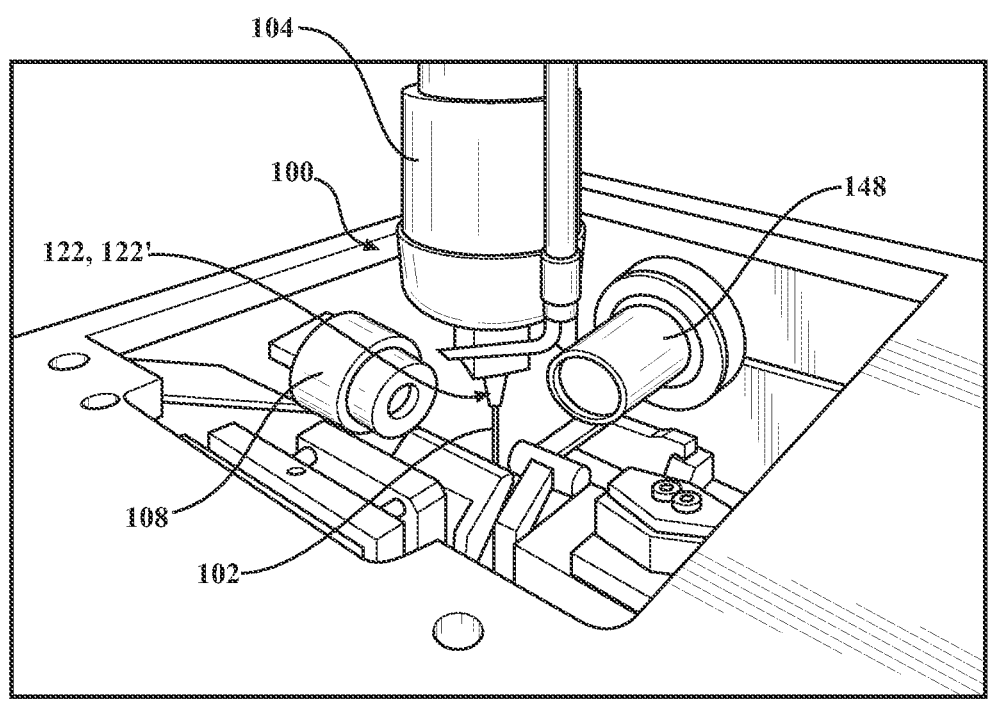

With reference to FIGS. 12-14, one embodiment of the cleaving assembly 100 according to the subject invention is shown. Specifically, FIG. 12 shows a DC power supply 120 connected to and powering the rotating device 110, as is well known to those skilled in the art. FIG. 13 shows the optical path of the laser head 118 and FIG. 14 shows a camera 148 and the laser device 108 and other optics.

Figure 15A:
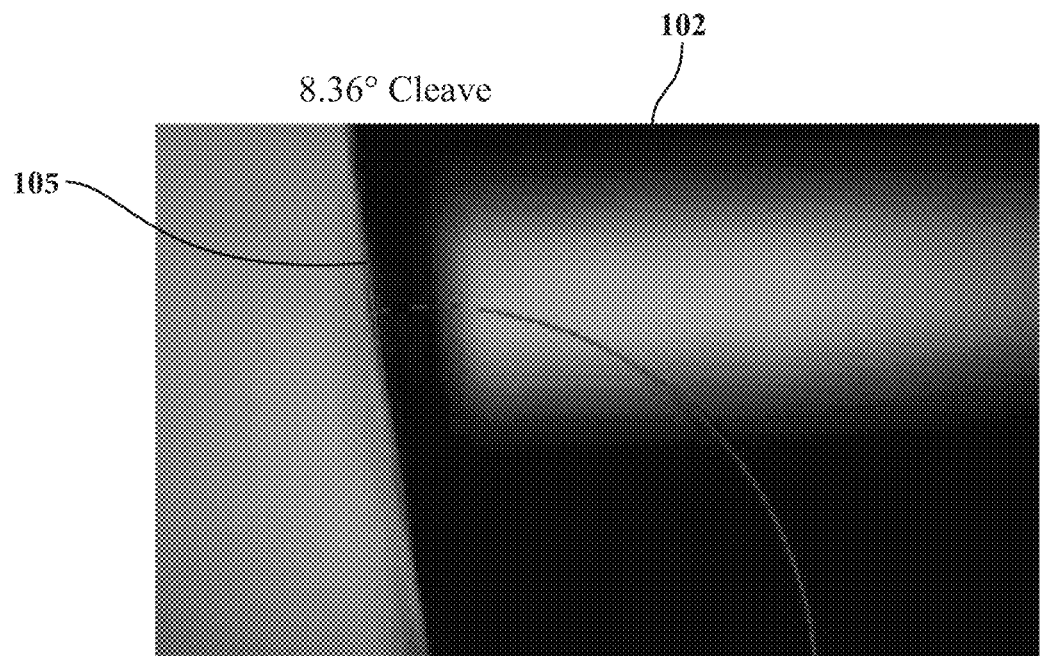
FIG. 15A is a photograph of a 1 mm glass rod having a cleave angle of 2.71 degrees.
Figure 15B:
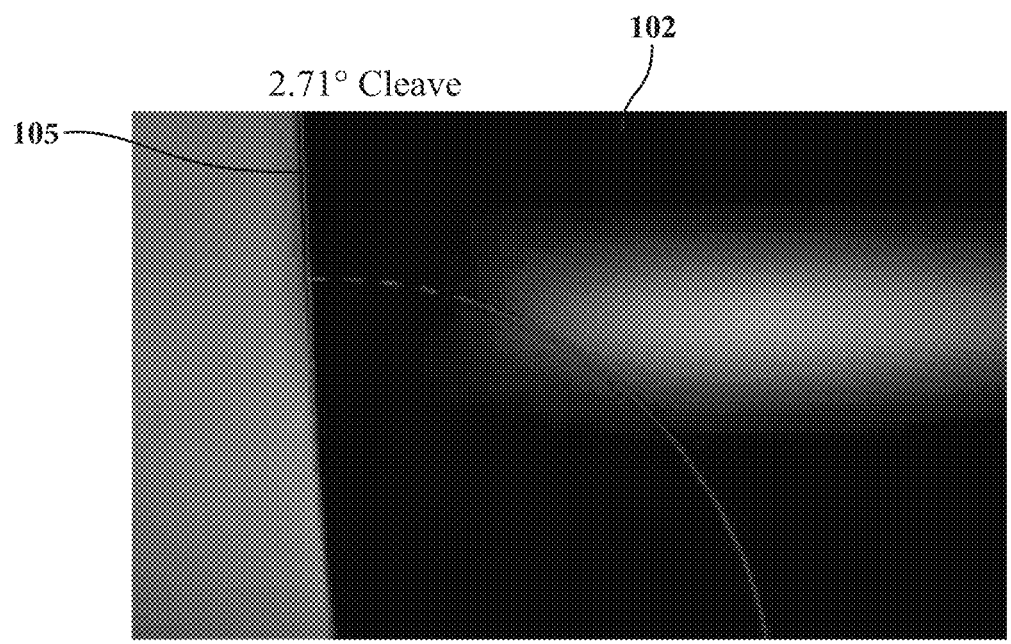
FIG. 15B is a photograph of a 1 mm glass rod having a cleave angle of 8.36 degrees.

With reference to FIGS. 15A-15B, close-up photographs of a 1 mm glass rod are shown that were effectively cleaved using the cleaving assembly 100 shown in FIGS. 12-14. Specifically, in FIG. 15A, the tip of the glass rod has been cleaved to an angle of 8.36 degrees, with a targeted value of 8.0 degrees. In FIG. 16B, the tip of the glass rod has been cleaved to an angle of 2.71 degrees, with a targeted value of 2.5 degrees.

Figure 16A:
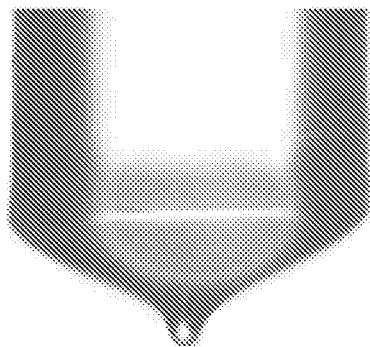
FIGS. 16A-16C are photographs of a perspective view of a glass body cleaved using prior art techniques.
Figure 16B:
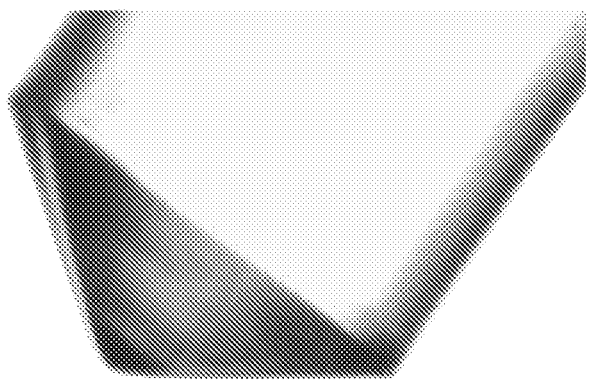
Figure 16C:
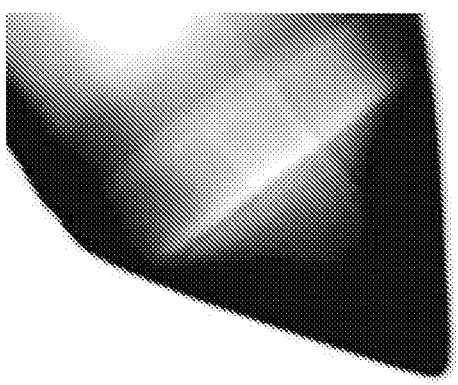

For illustrative purposes and to show the significance of the invention, rotating a glass body 102 during a laser cleaving process without the embodiment of this invention will create a conical or tapered surface 106 as shown in the photographs as FIG. 16A-16C. These approaches generally are not able to create a flat angle greater than 0 degrees without these type of detriments and irregularities. While rotating a glass body 102 around its axial center L during laser processing of large diameter fibers can reduce the entry/exit effects and create surfaces suitable for optical-grade transmission, this method is only viable for flat (0°) cleaves. FIGS. 16A-16C show glass bodies 102 that were merely rotated its axial center L that was orthogonal to the laser beam 104 and an unacceptable conical or tapered surface geometry was obtained.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A cleaving assembly for cleaving a glass body having a face at a desired angle greater than 0 degrees, said assembly comprising
   a laser device for emitting a laser beam;
   a rotating device comprising a head that rotates about a central axis that is orthogonal to said laser beam;
   a positioning fixture operatively mounted to said head and centered axially along said central axis, said positioning fixture rotatably driven by said rotating device; and
   wherein said positioning fixture has a tapered surface that is transverse to said central axis and that supports the glass body at a predetermined angle relative to said central axis, and wherein rotation of said positioning fixture about said central axis cleaves the face of the glass body at the desired angle due to the glass body being supported transverse to said central axis.

2. The cleaving assembly as set forth in claim 1 wherein said positioning fixture has an outer surface, a front face, and a rear face, said rear face defining a mount for operatively mounting to said head.

3. The cleaving assembly as set forth in claim 2 wherein said mount is further defined as being threaded.

4. The cleaving assembly as set forth in claim 2 further comprising an extender operatively mounted between said positioning fixture and said head.

5. The cleaving assembly as set forth in claim 4 further comprising an adapter operatively mounted between said extender and said head.

6. The cleaving assembly as set forth in claim 5 wherein said head is threaded.

7. The cleaving assembly as set forth in claim 6 wherein said adapter is threaded and wherein said extender is threaded for mounting to said adapter.

8. The cleaving assembly as set forth in claim 2 wherein said positioning fixture further comprises an inner bore extending between said front face and said rear face with said inner bore centered axially along said central axis.

9. The cleaving assembly as set forth in claim 8 wherein said tapered surface is defined as a channel in said outer surface that extends between said front face and said rear face.

10. The cleaving assembly as set forth in claim 9 wherein said tapered surface has said predetermined angle of from greater than 0 degrees to 45 degrees.

11. The cleaving assembly as set forth in claim 8 further comprising an insert sized to be disposed within said inner bore and said tapered surface is defined within said inner bore to secure the glass body at said predetermined angle.

12. The cleaving assembly as set forth in claim 11 wherein said insert further comprises an outer surface that is inclined at said predetermined angle to define said tapered surface.

13. The cleaving assembly as set forth in claim 11 wherein said inner bore further defines an inclined surface at said predetermined angle to define said tapered surface.

14. The cleaving assembly as set forth in claim 11 wherein said tapered surface has said predetermined angle of from 0.5 degrees to 45 degrees.

15. A method of cleaving a glass body with a cleaving assembly, the cleaving assembly including a laser device for emitting a laser beam, a rotating device having a head, and a positioning fixture, said method comprising the steps of:
   positioning the rotating device and the positioning fixture centrally aligned along a central axis that is orthogonal to the laser beam;
   mounting the positioning fixture to a head of the rotating device;
   supporting the glass body along a tapered surface of the positioning fixture, the tapered surface extending transverse to the central axis at a predetermined angle;
   rotating the positioning fixture and the head of the rotating device about the central axis while the glass body is supported at the predetermined angle such that the laser beam cleaves a face of the glass body at a desired angle corresponding to the predetermined angle.

16. The method as set forth in claim 15, wherein the step of supporting the glass body with the tapered surface is further defined as disposing the glass body in a channel in an outer surface of the positioning fixture with the channel defining the predetermined angle.

17. The method as set forth in claim 15, wherein the step of supporting the glass body with the tapered surface is further defined as disposing the glass body within an inner bore of the positioning fixture defining the predetermined angle.

18. The method as set forth in claim 17, further comprising the step of inserting an insert into the inner bore to define the predetermined angle.

19. The method as set forth in claim 15 wherein the tapered surface has the predetermined angle of from greater than 0 degrees to 45 degrees.

\* \* \* \* \*